(12) United States Patent
Toyooka et al.

(10) Patent No.: US 11,023,082 B2
(45) Date of Patent: Jun. 1, 2021

(54) TOUCH SENSOR AND METHOD FOR MANUFACTURING TOUCH SENSOR

(71) Applicant: FUJIFILM Corporation, Tokyo (JP)

(72) Inventors: Kentaro Toyooka, Fujinomiya (JP); Yohei Aritoshi, Fujinomiya (JP); Tatsuya Shimoyama, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/569,790

(22) Filed: Sep. 13, 2019

(65) Prior Publication Data

US 2020/0004383 A1    Jan. 2, 2020

Related U.S. Application Data

(63) Continuation of application No. PCT/JP2018/014356, filed on Apr. 4, 2018.

(30) Foreign Application Priority Data

Apr. 6, 2017  (JP) .............................. JP2017-076304
Apr. 2, 2018  (JP) .............................. JP2018-071137

(51) Int. Cl.
*G06F 3/044*    (2006.01)

(52) U.S. Cl.
CPC .......... *G06F 3/0443* (2019.05); *G06F 3/0445* (2019.05); *G06F 3/0446* (2019.05); *G06F 3/0448* (2019.05); *G06F 2203/04103* (2013.01)

(58) Field of Classification Search
CPC ................ G06F 3/0445; G06F 3/0448; G06F 2203/04103
See application file for complete search history.

(56) References Cited

U.S. PATENT DOCUMENTS

2012/0113021 A1    5/2012  Liu et al.
2015/0251393 A1*   9/2015  Kanna .................... B32B 37/26
                                                                      428/334
2015/0253899 A1    9/2015  Yang et al.

FOREIGN PATENT DOCUMENTS

JP          2013-206197 A     10/2013
JP          2013-546075 A     12/2013
                    (Continued)

OTHER PUBLICATIONS

International Search Report dated Jun. 19, 2018 in International Application No. PCT/JP2018/014356.
(Continued)

*Primary Examiner* — Robert J Michaud
(74) *Attorney, Agent, or Firm* — Sughrue Mion, PLLC (57) ABSTRACT

A touch sensor includes a first electrode pattern and a second electrode pattern respectively extending in mutually intersecting directions on the same surface of a transparent substrate and has a first transparent layer having a refractive index of 1.6 or more and a thickness of 200 nm or less and a second transparent layer having a refractive index of less than 1.6 and a thickness of 0.5 μm or more sequentially superimposed on the first and the second electrode patterns, the first electrode pattern has a plurality of first island-shaped electrode portions disposed at intervals and first wire portions that electrically connect the first island-shaped electrode portions, and the second electrode pattern has a plurality of second island-shaped electrode portions disposed at intervals and second wire portions that electrically connect the second island-shaped electrode portions by building a bridge on the first transparent layer and the second transparent layer.

18 Claims, 1 Drawing Sheet

(56) References Cited

FOREIGN PATENT DOCUMENTS

| | | | |
|---|---|---|---|
| JP | 2014-142834 A | 8/2014 | |
| JP | 2016-506574 A | 3/2016 | |
| JP | 2016506574 | * 3/2016 | ............. G06F 3/044 |

OTHER PUBLICATIONS

Written Opinion of the International Searching Authority dated Jun. 19, 2018 in International Application No. PCT/JP2018/014356.
International Preliminary Report on Patentability dated Oct. 8, 2019 in International Application No. PCT/JP2018/014356.
Communication dated Nov. 4, 2020 from the Japanese Patent Office in Application No. 2019-511272.

* cited by examiner

TOUCH SENSOR AND METHOD FOR MANUFACTURING TOUCH SENSOR

CROSS-REFERENCE TO RELATED APPLICATIONS

This application is a Continuation of PCT International Application No. PCT/JP2018/14356, filed on Apr. 4, 2018, which claims priority under 35 U.S.C. § 119(a) to Japanese Patent Application No. 2017-076304, filed on Apr. 6, 2017 and Japanese Patent Application No. 2018-071137, filed on Apr. 2, 2018. Each of the above application(s) is hereby expressly incorporated by reference, in its entirety, into the present application.

BACKGROUND OF THE INVENTION

1. Field of the Invention

The present disclosure relates to a touch sensor and a method for manufacturing a touch sensor.

2. Description of the Related Art

In recent years, input devices in which information corresponding to command images can be input by touching the command images with a member having a fine tip such as a finger or a stylus (hereinafter, also referred to as touch panels) have been broadly used. As touch panels, there are resistance film-type touch panels, electrostatic capacitance-type touch panels, and the like. Electrostatic capacitance-type touch panels have an advantage of being capable of having a simple structure in which a translucent conductive film is formed on a single substrate.

As electrostatic capacitance-type devices, for example, a touch sensor in which electrode patterns are extended in mutually intersecting directions and an input location is detected by sensing a change in electrostatic capacitance between electrodes caused at the time of touching the touch sensor with a finger or the like is known (for example, refer to JP2013-206197A.).

Meanwhile, during the use of a touch panel that is an electrostatic capacitance-type device, for example, in the case of observing the surface of the touch panel from a spot slightly apart from the vicinity of a location at which light incident from an internal light source is normally reflected, there is a case where an electrode pattern present in the panel is shown, and the appearance is impaired. For devices such as touch panels, there is a need for improvement in an electrode pattern-covering property.

As a technique relating to the electrode pattern-covering property, the setting of the refractive index of an insulating body disposed between a first electric wire that electrically connects a plurality of first patterns having a first refractive index and a second electric wire that electrically connects a plurality of second patterns having a second refractive index to be substantially equal to the first refractive index and the second refractive index is disclosed (for example, refer to JP2013-546075A).

SUMMARY OF THE INVENTION

In the technique described in JP2013-206197A, an effect for preventing a pattern in a bridge portion from being visible is expected by installing a bridge wire through a high-refractive index insulating film having a refractive index that is substantially equal to the refractive index of the electrode. However, the touch sensor is formed to have a high refractive index as a whole, and thus the difference in refractive index with a layer installed above the touch sensor (refractive index: near 1.5) increases, and consequently, there is a problem in that a pattern in the electrode is likely to be visible and the pattern cannot be sufficiently covered.

The present disclosure has been made in consideration of the above-described circumstance.

An object that the present disclosure intends to achieve is to provide a touch sensor being excellent in terms of an electrode pattern-covering property.

An object that another embodiment of the present invention intends to achieve is to provide a method for manufacturing a touch sensor having an electrode pattern-covering property improved more than in the related art.

As specific means for achieving the above-described objects, the following aspects are included.

<1> A touch sensor comprising: a first electrode pattern and a second electrode pattern respectively extending in mutually intersecting directions on the same surface of a transparent substrate, a first transparent layer having a refractive index of 1.6 or more and a thickness of 200 nm or less and a second transparent layer having a refractive index of less than 1.6 and a thickness of 0.5 µm or more, the first transparent layer and the second transparent layer being sequentially superimposed on the first electrode pattern and the second electrode pattern, in which the first electrode pattern has a plurality of first island-shaped electrode portions disposed at intervals in a first direction on the substrate and first wire portions that electrically connect the first island-shaped electrode portions adjacent to each other, and the second electrode pattern has a plurality of second island-shaped electrode portions disposed at intervals in a second direction intersecting the first direction on the substrate and second wire portions that electrically connect the second island-shaped electrode portions adjacent to each other by building a bridge on the first transparent layer and the second transparent layer.

<2> The touch sensor according to <1>, in which the first transparent layer and the second transparent layer have through holes, and the second wire portions electrically connect the second island-shaped electrode portions adjacent to each other through the through holes.

<3> The touch sensor according to <1> or <2>, in which the second wire portion is formed of a metal wire.

<4> The touch sensor according to any one of <1> to <3>, in which the first transparent layer has a thickness of 40 nm or more and 200 nm or less and a refractive index of 1.6 or more and 1.9 or less, and the second transparent layer has a thickness of 0.5 µm or more and 20 µm or less and a refractive index of 1.4 or more and less than 1.6.

<5> The touch sensor according to any one of <1> to <4>, in which the first transparent layer directly contacts with at least one of the first electrode pattern or the second electrode pattern.

<6> The touch sensor according to any one of <1> to <5>, further comprising: a third transparent layer having a refractive index of 1.6 or more and a thickness of 40 nm or more and 200 nm or less between the second transparent layer and the second wire portions.

<7> The touch sensor according to any one of <1> to <6>, in which the second transparent layer is a cured substance of a composition including an alkali-soluble resin, a polymerizable monomer, and a photopolymerization initiator.

<8> The touch sensor according to <7>, in which a weight-average molecular weight of the alkali-soluble resin is 35,000 or less.

<9> The touch sensor according to <7> or <8>, in which a content of a component derived from the alkali-soluble resin in the second transparent layer is 30% by mass or more of a solid content of the second transparent layer.

<10> A method for manufacturing the touch sensor according to any one of <1> to <9>, the method sequentially comprising: a step of forming a first transparent layer having a refractive index of 1.6 or more and a thickness of 200 nm or less on an electrode pattern-attached base material by transferring a transfer layer of a transfer material; and a step of forming a second transparent layer having a refractive index of less than 1.6 and a thickness of 0.5 µm or more on the electrode pattern-attached base material by transferring a transfer layer of a transfer material.

According to the present disclosure, a touch sensor being excellent in terms of an electrode pattern-covering property is provided.

According to another embodiment of the present invention, a method for manufacturing a touch sensor having an electrode pattern-covering property improved more than in the related art is provided.

DESCRIPTION OF THE PREFERRED EMBODIMENTS

Hereinafter, a touch sensor and a method for manufacturing a touch sensor of an embodiment of the present disclosure will be described in detail.

In the present specification, a numerical range expressed using "to" indicates a range including numerical values before and after "to" as the minimum value and the maximum value respectively. In numerical ranges expressed stepwise in the present disclosure, the upper limit value or the lower limit value described in a certain numerical range may be substituted into the upper limit value or the lower limit value of a different numerical range expressed stepwise. In addition, in numerical ranges expressed in the present disclosure, the upper limit value or the lower limit value described in a certain numerical range may be substituted into a value described in an example.

In the present specification, in a case where there is a plurality of substances corresponding to a certain component in a composition, unless particularly otherwise described, the amount of the component in the composition refers to the total amount of the plurality of substances present in the composition.

In addition, the term "step" in the present specification refers not only to an independent step but also a step that cannot be clearly differentiated from other steps as long as the intended purpose of the step is achieved.

In the present specification, "being transparent" means that the average transmittance of visible light having a wavelength of 400 nm to 700 nm is 80% or more. Therefore, a "transparent conductive layer" refers to a layer having an average transmittance of visible light having a wavelength of 400 nm to 700 nm being 80% or more. The average transmittance of visible light of the "transparent conductive layer" is preferably 90% or more.

In addition, the average transmittance of the transparent conductive layer is a value measured using a spectral photometer and can be measured using, for example, a spectral photometer U-3310 manufactured by Hitachi, Ltd.

In the present specification, unless particularly otherwise described, the content ratio of each structural unit of a polymer is a molar ratio.

In the present specification, in a case where there is a molecular weight distribution, the molecular weight refers to the weight-average molecular weight (Mw) unless particularly otherwise described.

In addition, in the present specification, the refractive index is a value measured using an ellipsometry at a wavelength of 550 nm unless particularly otherwise described.

<Touch Sensor>

A touch sensor of the present disclosure includes a first electrode pattern and a second electrode pattern respectively extending in mutually intersecting directions on the same surface of a transparent substrate and has a first transparent layer having a refractive index of 1.6 or more and a thickness of 200 nm or less and a second transparent layer having a refractive index of less than 1.6 and a thickness of 0.5 µm or more, the first transparent layer and the second transparent layer being sequentially superimposed on the first electrode pattern and the second electrode pattern (a surface opposite to the transparent substrate).

The first electrode pattern has a plurality of first island-shaped electrode portions disposed at intervals in a first direction on the substrate and first wire portions that electrically connect the first island-shaped electrode portions adjacent to each other.

The second electrode pattern has a plurality of second island-shaped electrode portions disposed at intervals in a second direction intersecting the first direction on the substrate and second wire portions that electrically connect the second island-shaped electrode portions adjacent to each other by building a bridge on the first transparent layer and the second transparent layer.

In the related art, touch sensors in which electrode patterns to which a plurality of electrode portions is electrically connected are respectively disposed in two mutually intersecting directions on the same surface of a base material and a bridge structure is formed in an intersection portion are known. In the intersection portion, the electrode patterns are easily seen, and studies are underway to improve the visibility of the electrode patterns in the intersection portion.

The touch sensor of the embodiment of the present disclosure is, as described above, provided in a superimposed manner with a thin high-refractive index layer and a low-refractive index layer that is thicker than the high-refractive index layer and has a low refractive index on the first electrode pattern having the plurality of first island-shaped electrode portions and the second electrode pattern having the plurality of second island-shaped electrode portions and thus improves in the electrode pattern-covering property.

An embodiment of the touch sensor of the embodiment of the present disclosure will be described with reference to FIG. 1 and FIG. 2.

Figure 1:
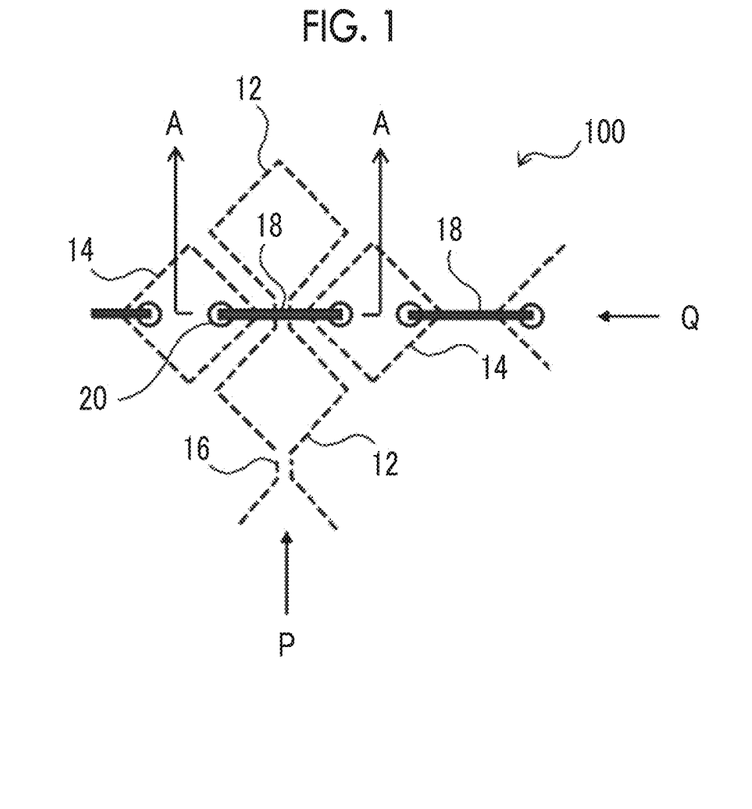
FIG. 1 is a plan view showing an example of a first electrode pattern and a second electrode pattern disposed in a touch panel.
Figure 2:
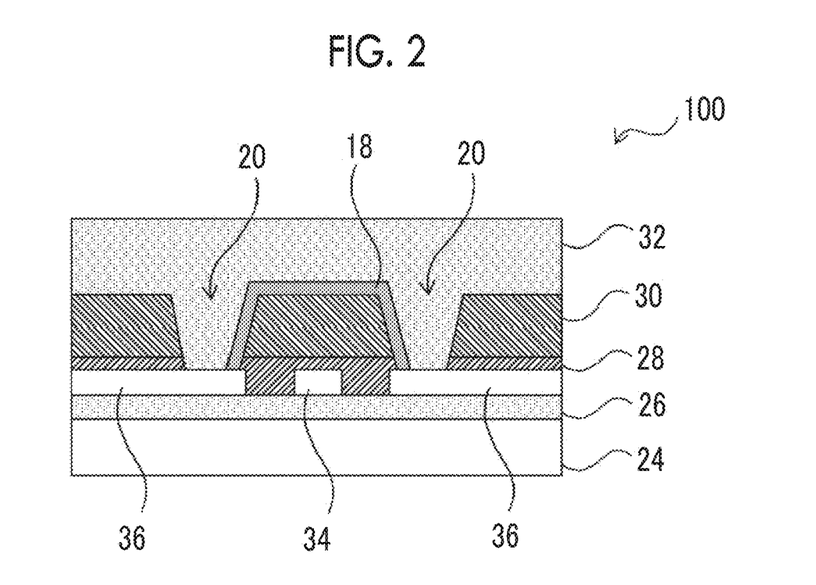
FIG. 2 is a cross-sectional view in a direction of an A-A line in FIG. 1.

FIG. 1 is a plan view of the touch sensor of the embodiment of the present disclosure, and FIG. 2 is a cross-sectional view in a direction of an A-A line in FIG. 1.

A touch sensor 100 of the embodiment of the present disclosure has a first electrode pattern 34 and a second electrode pattern 36 which respectively extend in an arrow P direction and an arrow Q direction that intersect each other on a transparent substrate 24.

FIG. 1 and FIG. 2 only show a part of the touch sensor; however, on the transparent substrate, the first electrode pattern 34 is arranged in one direction (first direction) across a broad range of the transparent substrate, and, furthermore, the second electrode pattern 36 is arranged in a direction different from the first direction (second direction) across a broad range of the transparent substrate.

—Transparent Substrate—

The transparent substrate is an electrically insulating substrate, and examples thereof include a glass substrate, a polyethylene terephthalate (PET) film, a polycarbonate (PC) film, a cycloolefin polymer (COP) film, a polyvinyl chloride (PVC) film, and the like.

A COP film is preferred since the COP film is excellent not only in optical isotropy but also in dimensional stability and, furthermore, processing accuracy. In a case where the transparent substrate is a glass substrate, the thickness may be 0.3 mm or more and 3 mm or less. In addition, in a case where the transparent substrate 24 is a resin film, the thickness may be 20 μm or more and 3 mm or less.

—Electrode Pattern—

The touch sensor of the embodiment of the present disclosure includes the first electrode pattern and the second electrode pattern respectively extending in mutually intersecting directions (hereinafter, both will be collectively referred to as, simply, "electrode patterns" in some cases) on the same surface of the transparent substrate.

In FIG. 1, the first electrode pattern 34 has a plurality of square-shaped electrode portions (first island-shaped electrode portions) 12 disposed in an island shape at equal intervals along the arrow P direction on the transparent substrate 24, and the first island-shaped electrode portions 12 adjacent to each other are connected by a first wire portion 16. Therefore, a long electrode is formed in one direction on a surface of the transparent substrate.

The first wire portion is preferably formed of the same material as the first island-shaped electrode portion.

In addition, in FIG. 1, the second electrode pattern 36 has square-shaped electrode portions (second island-shaped electrode portions) 14, which are almost similar to the first island-shaped electrode portions, disposed in an island shape at equal intervals along the arrow Q direction substantially perpendicular to the arrow P direction on the transparent substrate 24, and the second island-shaped electrode portions 14 adjacent to each other are connected by a second wire portion 18 (bridge wire).

Therefore, a long electrode is formed in one direction different from that in the first electrode pattern on the surface of the transparent substrate.

The second wire portion is preferably formed of a metal wire.

As shown in FIG. 1 and FIG. 2, in an intersection portion, the first electrode pattern 34 and the second electrode pattern 36 forms a bridge structure in which one of the intersecting electrodes jumps over the other so as to prevent both patterns from being electrically connected to each other.

In the touch sensor of the embodiment of the present disclosure, the refractive index of the electrode patterns is preferably 1.75 or more and 2.1 or less.

As a material of the first electrode pattern and the second electrode pattern, materials capable of forming a transparent conductive film are exemplified, and examples thereof include metal oxides such as indium tin oxide (ITO), aluminum zinc oxide (AZO), and indium zinc oxide (IZO).

The material of the electrode patterns is not particularly limited, and it is possible to use well-known materials.

For example, the electrode patterns can be produced using a translucent conductive metal oxide film such as indium tin oxide (ITO) or indium zinc oxide (IZO). As a metal film, an ITO film; metal films of Al, Zn, Cu, Fe, Ni, Cr, Mo, Ag, Au, and the like and alloy films of a plurality of metals such as a copper-nickel alloy; metal oxide films of $SiO_2$ and the like, and the like are exemplified.

The thickness of the electrode patterns can be set to 10 nm or more and 200 nm or less.

In addition, an amorphous ITO film may be transformed to a polycrystalline ITO film by firing.

In the case of forming a conductive pattern or the like using ITO or the like, it is possible to refer to the description of Paragraphs 0014 to 0016 in the specification of JP4506785B.

—First Transparent Layer and Second Transparent Layer—

On the first electrode pattern and the second electrode pattern (a surface opposite to the transparent substrate), the first transparent layer having a thin thickness and a high refractive index and the second transparent layer having a thicker thickness and a lower refractive index than the first transparent layer are sequentially superimposed from the electrode pattern side.

In the touch sensor shown in FIG. 2, a first transparent layer 28 is provided so as to cover the first electrode pattern 34 and the second electrode pattern 36, and a second transparent layer 30 is further provided on the first transparent layer 28.

(First Transparent Layer)

The first transparent layer is a transparent layer having a refractive index of 1.6 or more and a thickness of 200 nm or less.

The refractive index of the first transparent layer is preferably 1.6 or more and 1.9 or less and more preferably 1.65 or more and 1.8 or less.

The thickness of the first transparent layer is preferably 200 nm or less, more preferably 40 nm or more and 200 nm or less, and still more preferably 50 nm or more and 100 nm or less.

Particularly, the first transparent layer preferably has a thickness of 40 nm or more and 200 nm or less and a refractive index of 1.6 or more and 1.9 or less.

The thickness of the first transparent layer is the average thickness measured using a transmission electron microscope (TEM). Specifically, a segment of the touch panel is formed using an ultramicrotome, a 5 mm-long region in a cross section of the segment is scanned using TEM, and the thickness of the first transparent layer is measured. Next, the arithmetic average of the measurement values of the thicknesses at 20 places separated at equal intervals was obtained and regarded as the average thickness.

As long as the first transparent layer in the touch sensor of the embodiment of the present disclosure is a transparent film having a refractive index of 1.6 or more and a thickness of 200 nm or less, there is no particular limitation on the material. For the first transparent layer, for example, a metal oxide layer formed by sputtering may be used or a cured layer obtained by a curing reaction of a curing component in a first transparent transfer layer described below may be used.

The first transparent layer may be, for example, a layer formed by transferring the first transparent transfer layer of a transfer material described below onto the first electrode pattern and the second electrode pattern and causing a curing reaction.

The detail of a component forming the first transparent layer will be clarified in the description of the first transparent transfer layer in the transfer material described below (Second Transparent Layer)

The second transparent layer is a transparent layer having a refractive index of less than 1.6 and a thickness of 0.5 μm or more.

The refractive index of the second transparent layer is preferably 1.4 or more and less than 1.6 and more preferably 1.45 or more and 1.55 or less.

The thickness of the second transparent layer is preferably 0.5 μm or more, more preferably 0.5 μm or more and 20 μm or less, still more preferably 3 μm or more and 12 μm or less, and far still more preferably 1 μm or more and 10 μm or less.

Particularly, the second transparent layer preferably has a thickness of 0.5 μm or more and 20 μm or less and a refractive index of 1.4 or more and less than 1.6.

The thickness of the second transparent layer is the average thickness measured using a transmission electron microscope (TEM) and can be measured in the same manner as in the case of the first transparent layer.

The second transparent layer in the touch sensor of the embodiment of the present disclosure is preferably a cured layer obtained by a curing reaction of a curing component in a second transparent transfer layer described below.

The second transparent layer may be, for example, a layer formed by transferring the second transparent transfer layer of the transfer material described below and causing a curing reaction.

The second transparent layer is preferably a cured substance of a composition including an alkali-soluble resin, a polymerizable monomer, and a photopolymerization initiator.

The weight-average molecular weight of the alkali-soluble resin is preferably 35,000 or less, more preferably 25,000 or less, and still more preferably 20,000 or less.

The detail of a component forming the second transparent layer will be clarified in the description of the second transparent transfer layer in the transfer material described below including the alkali-soluble resin, the polymerizable monomer, and the photopolymerization initiator.

The weight-average molecular weight is a value measured by gel permeation chromatography (GPC), and the detail of a measurement method will be described in the section of examples.

The content of a component derived from the alkali-soluble resin in the second transparent layer is preferably 30% by mass or more of the solid content of the second transparent layer. The content of the component derived from the alkali-soluble resin is preferably 30% by mass or more from the viewpoint of forming the second transparent layer in a tapered shape. The content of the component derived from the alkali-soluble resin is more preferably 40% by mass to 70% by mass of the solid content of the second transparent layer.

In the first transparent layer and the second transparent layer, through holes are preferably formed. In addition, an aspect in which the second wire portion electrically connects the second island-shaped electrode portions adjacent to each other through the through hole.

The through holes can be formed by patterning in which light is radiated through a mask for forming desired through holes to the first transparent layer and the second transparent layer.

The pore diameter of the through hole is preferably smaller relative to the width and the length of the second wire portion.

—Third Transparent Layer—

Between the second transparent layer and the second wire portions, a third transparent layer having a refractive index of 1.6 or more and a thickness of 40 nm or more and 200 nm or less is preferably provided.

The refractive index of the third transparent layer is preferably 1.6 or more and 1.9 or less and more preferably 1.65 or more and 1.8 or less.

The thickness of the third transparent layer is preferably 200 nm or less, more preferably 40 nm or more and 200 nm or less, and still more preferably 50 nm or more and 100 nm or less.

In particular, the third transparent layer preferably has a thickness of 40 nm or more and 200 nm or less and a refractive index of 1.6 or more and 1.9 or less.

The thickness of the third transparent layer is the average thickness measured using a transmission electron microscope (TEM) and can be measured in the same manner as in the case of the first transparent layer.

The third transparent layer can be formed in the same manner as the first transparent layer and can be formed by, for example, transferring a first transparent transfer layer of the transfer material having the first transparent transfer layer on a temporary support.

Next, a transfer material preferable for the production of the touch panel of the embodiment of the present disclosure will be described.

As the transfer material, it is possible to use a material sequentially having a temporary support, from the temporary support side, the second transparent transfer layer having a refractive index of less than 1.6 and a thickness of 0.5 μm or more, and the first transparent transfer layer having a refractive index of 1.6 or more and a thickness of 200 nm or less.

According to the transfer material, a laminate having excellent adhesiveness and an excellent electrode pattern-covering property can be obtained.

(Temporary Support)

A material of the temporary support is not particularly limited as long as the material has a strength and flexibility necessary for the formation of a film. A resin film is preferred from the viewpoint of formability and costs.

A film that is used as the temporary support is preferably a flexible film that does not significantly deform, shrink, or stretch under pressurization or under pressurization and heating.

More specifically, as the temporary support, a polyethylene terephthalate (PET) film, a triacetyl cellulose (TAC) film, a polystyrene (PS) film, a polycarbonate (PC) film, and the like are exemplified, and a biaxially stretched polyethylene terephthalate film is preferred.

The appearance of the temporary support is also not particularly limited, and the temporary support may be a transparent film or a colored film. As the colored film, resin films containing a silicon dye, an alumina sol, a chromium salt, a zirconium salt, or the like are exemplified.

To the temporary support, it is possible to impart a conductive property using a method described in JP2005-221726A or the like.

Hereinafter, regarding the layers on the temporary support, the second transparent transfer layer close to the temporary support will be described, and then the first transparent transfer layer on the second transparent transfer layer will be described.

In the case of forming the touch panel of the embodiment of the present disclosure using the transfer material, a layer formed by the curing reaction of the second transparent transfer layer is the second transparent layer, and a layer formed by the curing reaction of the first transparent transfer layer is the first transparent layer.

(Second Transparent Transfer Layer)

The second transparent transfer layer may be, for example, a layer including at least a polymerizable monomer and a resin or may be a layer that is cured by imparting energy. The second transparent transfer layer may further include a polymerization initiator and a compound capable of reacting with an acid by heating.

The second transparent transfer layer may be light-curable, heat-curable, or heat-curable and light-curable. Particularly, the second transparent transfer layer is preferably a heat-curable and light-curable composition since it is possible to further improve the reliability of the film.

Specifically, the second transparent transfer layer may be formed by transferring the second transparent transfer layer to a transfer target by a transfer method using the transfer material having the second transparent transfer layer on the temporary support, patterning the transferred second transparent transfer layer by radiating light thereto, and developing or the like the second transparent transfer layer.

It is preferable that the second transparent transfer layer is an alkali-soluble resin layer and can be developed by a weak alkali aqueous solution.

(Thickness)

The thickness of the second transparent transfer layer is not particularly limited and can be appropriately selected depending on the purpose. For example, in a case where the touch sensor of the embodiment of the present disclosure is an electrostatic capacitance-type input device, the thickness of the second transparent transfer layer is preferably 1 μm or more and 20 μm or less, more preferably 2 μm or more and 15 μm or less, still more preferably 3 μm or more and 12 μm or less, and particularly preferably 6 μm or more and 12 μm or less from the viewpoint of transparency.

(Composition)

The second transparent transfer layer may be formed of a negative-type material including a polymerizable monomer. In this case, the second transparent transfer layer becomes excellent in terms of strength and reliability.

—Resin—

The second transparent transfer layer is capable of containing at least one kind of resin. The resin is capable of functioning as a binder. The resin included in the second transparent transfer layer is preferably an alkali-soluble resin.

The alkali-soluble resin is preferably, for example, a resin having an acid value of 60 mgKOH/g or more from the viewpoint of developability. In addition, a resin having a carboxyl group is preferred since the resin reacts with a crosslinking component to thermally cross-link and is likely to form a strong film.

The alkali-soluble resin is preferably an acrylic resin from the viewpoint of developability and transparency. The acrylic resin refers to a resin having a configurational unit derived from at least one kind of (meth)acrylic acid or (meth)acrylic acid ester.

The acid value of the alkali-soluble resin is not particularly limited, but a carboxyl group-containing acrylic resin having an acid value of 60 mgKOH/g or more is preferred.

The carboxyl group-containing acrylic resin having an acid value of 60 mgKOH/g or more is not particularly limited as long as the condition of the acid value is satisfied, and a resin appropriately selected from well-known resins can be used. For example, among the polymers described in Paragraph 0025 of JP2011-095716A, the carboxyl group-containing acrylic resin having an acid value of 60 mgKOH/g or more, among the polymers described in Paragraphs 0033 to 0052 of JP2010-237589A, the carboxyl group-containing acrylic resin having an acid value of 60 mgKOH/g or more, and the like are exemplified.

A preferred range of the copolymerization ratio of a monomer having a carboxyl group in the alkali-soluble resin is 5% by mass to 50% by mass, more preferably 5% by mass to 40% by mass, and still more preferably in a range of 20% by mass to 30% by mass with respect to 100% by mass of the alkali-soluble resin.

As the alkali-soluble resin, polymers shown below are preferred. The content ratio of each structural unit shown below can be appropriately changed depending on the purpose.

Compound A

Specifically, the acid value of the alkali-soluble resin is preferably 60 mgKOH/g to 200 mgKOH/g, more preferably 60 mgKOH/g to 150 mgKOH/g, and still more preferably 60 mgKOH/g to 110 mgKOH/g.

In the present specification, the acid value of the resin is a value measured using a titration method regulated in JIS K0070 (1992).

In a case where both the second transparent transfer layer and the first transparent transfer layer described below contain the acrylic resin, it is possible to enhance the interlayer adhesiveness between the second transparent transfer layer and the first transparent transfer layer.

The weight-average molecular weight of the alkali-soluble resin is preferably 5,000 or more and more preferably 10,000 or more. The upper limit value of the weight-average molecular weight of the alkali-soluble resin is not particularly limited, but is preferably 35,000 or less, more preferably 25,000 or less, and still more preferably 20,000 or less, and may be set to 100,000.

The weight-average molecular weight of the alkali-soluble resin is a value measured by GPC, and the detail of the measurement method will be described in the section of the examples.

From the viewpoint of the handleability of a film to be cured and the hardness of the film to be cured, the content of the resin is preferably in a range of 10% by mass to 80% by mass and more preferably in a range of 40% by mass to 60% by mass of the total solid content amount of the second transparent transfer layer. In a case where the content of the resin is 80% by mass or less, the amount of the monomer does not become too small, the crosslink density of a cured film is favorably maintained, and the second transparent transfer layer becomes excellent in terms of hardness. In addition, in a case where the content of the resin is 10% by mass or more, the film to be cured does not become too soft, and there is an advantage in handleability in the film.

—Polymerizable Monomer—

The second transparent transfer layer in the present disclosure may contain a polymerizable monomer.

As the polymerizable monomer, the second transparent transfer layer preferably includes a polymerizable monomer having an ethylenic unsaturated group and more preferably includes a photopolymerizable compound having an ethylenic unsaturated group. The polymerizable monomer preferably has at least one ethylenic unsaturated group as a photopolymerizable group and may have a cationic polymerizable group such as an epoxy group in addition to the ethylenic unsaturated group. The polymerizable monomer included in the second transparent transfer layer is preferably a compound having a (meth)acryloyl group.

The second transparent transfer layer preferably includes, as the polymerizable monomer, a compound having two ethylenic unsaturated groups and a compound having at least three ethylenic unsaturated groups and more preferably includes a compound having two (meth)acryloyl groups and a compound having at least three (meth)acryloyl groups.

In addition, at least one kind of the polymerizable monomer preferably contains a carboxyl group since a carboxyl group in a specific binder and the carboxyl group in the polymerizable monomer form a carboxyl acid anhydride, thereby enhancing moisture-heat resistance.

The polymerizable monomer containing a carboxyl group is not particularly limited, and commercially available compounds can be used. As commercially available products, for example, ARONIX TO-2349 (manufactured by Toagosei Co., Ltd.), ARONIX M-520 (manufactured by Toagosei Co., Ltd.), ARONIX M-510 (manufactured by Toagosei Co., Ltd.), and the like are preferably exemplified. In a case where the second transparent transfer layer includes the polymerizable monomer containing a carboxyl group, the content of the polymerizable monomer containing a carboxyl group used is preferably in a range of 1% by mass to 50% by mass, more preferably in a range of 1% by mass to 30% by mass, and still more preferably in a range of 5% by mass to 15% by mass of all of the polymerizable monomers included in the second transparent transfer layer.

The second transparent transfer layer preferably includes a urethane (meth)acrylate compound as the polymerizable monomer.

In a case where the second transparent transfer layer includes the urethane (meth)acrylate compound, the content thereof is preferably 10% by mass or more and more preferably 20% by mass or more of all of the polymerizable monomers included in the second transparent transfer layer. The number of functional groups of the photopolymerizable group in the urethane (meth)acrylate compound, that is, the number of (meth)acryloyl groups is preferably three or more and more preferably four or more.

The polymerizable monomer having a bifunctional ethylenic unsaturated group is not particularly limited as long as the polymerizable monomer is a compound having two ethylenic unsaturated groups in the molecule, and it is possible to use commercially available (meth)acrylate compounds. As commercially available products, for example, tricyclodecane dimethanol diacrylate (A-DCP, manufactured by Shin-Nakamura Chemical Co., Ltd.), tricyclodecane dimethanol dimethacrylate (DCP, manufactured by Shin-Nakamura Chemical Co., Ltd.), 1,9-nonanediol diacrylate (A-NOD-N, manufactured by Shin-Nakamura Chemical Co., Ltd.), 1,6-hexanediol diacrylate (A-HD-N, manufactured by Shin-Nakamura Chemical Co., Ltd.), and the like are preferably exemplified.

A polymerizable monomer having a tri- or higher-functional ethylenic unsaturated group is not particularly limited as long as the polymerizable monomer is a compound having three or more ethylenic unsaturated groups in a molecule, and it is possible to use, for example, (meth)acrylate compounds having a skeleton such as dipentaerythritol (tri/tetra/penta/hexa)acrylate, pentaerythritol (tri/tetra)acrylate, trimethylolpropane triacrylate, ditrimethylolpropane tetraacrylate, isocyanurate acrylate, and glycerine triacrylate.

The weight-average molecular weight of the polymerizable monomer is preferably 200 to 3,000, more preferably 250 to 2,600, and particularly preferably 280 to 2,200.

Only one kind of the polymerizable monomer may be used, or two or more kinds of the polymerizable monomers may be used. Two or more kinds of the polymerizable monomers are preferably used since it is possible to control the film properties of the second transparent transfer layer.

Particularly, as the polymerizable monomer contained in the second transparent transfer layer, a combination of a tri- or higher-functional polymerizable monomer and a bifunctional polymerizable monomer is preferably used from the viewpoint of improving the film properties of the transferred second transparent transfer layer after being exposed.

In the case of using a bifunctional polymerizable monomer, the amount of the bifunctional polymerizable monomer used is preferably in a range of 10% by mass to 90% by mass, more preferably in a range of 20% by mass to 85% by mass, and still more preferably in a range of 30% by mass to 80% by mass of all of the polymerizable monomers included in the second transparent transfer layer.

In the case of using a tri- or higher-functional polymerizable monomer, the amount of the tri- or higher-functional polymerizable monomer used is preferably in a range of 10% by mass to 90% by mass, more preferably in a range of 15% by mass to 80% by mass, and still more preferably in a range of 20% by mass to 70% by mass of all of the polymerizable monomers included in the second transparent transfer layer.

To the second transparent transfer layer, it is possible to further add a variety of components depending on the purpose in addition to the resin and the polymerizable monomer.

As a random component, a polymerization initiator, a compound capable of reacting with an acid by heating, and the like are exemplified.

—Polymerization Initiator—

The second transparent transfer layer preferably includes a polymerization initiator and more preferably includes a photopolymerization initiator. In a case where the second transparent transfer layer includes the polymerization initiator in addition to the resin and the polymerizable monomer, it becomes easy to form a pattern in the second transparent transfer layer.

As the polymerization initiator, photopolymerization initiators described in Paragraphs 0031 to 0042 of JP2011-095716A are exemplified. As the photopolymerization initiator, for example, 1,2-octane dione, 1-[4-(phenylthio)-, 2-(O-benzoyloxime)] (trade name: IRGACURE OXE-01, manufactured by BASF), additionally, ethanone,1-[9-ethyl-6-(2-methylbenzoyl)-9H-carbazole-3-yl]-, 1-(O-acetyloxime) (trade name: IRGACURE OXE-02, manufactured by BASF), 2-(dimethylamino)-2-[(4-methylphenyl)methyl]-1-[4-(4-morpholinyl)phenyl]-1-butanone (trade name: IRGA- CURE 379EG, manufactured by BASF), 2-methyl-1-(4-methyl thiophenyl)-2-morpholino propan-1-one (trade name: IRGACURE 907, manufactured by BASF), and the like are preferably exemplified.

In a case where the second transparent transfer layer includes the polymerization initiator, the content of the polymerization initiator is preferably 0.01% by mass or more and more preferably 0.1% by mass or more of the solid content of the second transparent transfer layer. In addition, the content is preferably 10% by mass or less and more preferably 5% by mass or less. In a case where the content of the polymerization initiator is in the above-described range, it is possible to further improve pattern formability in the transfer material and adhesiveness to transfer targets.

The second transparent transfer layer in the present disclosure is capable of further including at least one selected from a sensitizer or a polymerization inhibitor in order to adjust the curing sensitivity.

—Sensitizer—

The second transparent transfer layer in the present disclosure is capable of including a sensitizer.

The sensitizer has an action of further improving the sensitivity of a sensitizing dye, the polymerization initiator, or the like included in the second transparent transfer layer with respect to active radioactive rays, an action of suppressing the polymerization inhibition of the polymerizable compound by oxygen, or the like.

As an example of the sensitizer in the present disclosure, thiol and sulfide compounds, for example, thiol compounds described in JP1978-000702A (JP-S53-000702A), JP1980-500806B (JP-S55-500806B), and JP1993-142772A (JP-H5-142772A), disulfide compounds of JP1981-075643A (JP-S56-075643A), and the like are exemplified. More specifically, 2-mercaptobenzothiazole, 2-mercaptobenzoxazole, 2-mercaptobenzimidazole, 2-mercapto-4 (3H)-quinazoline, β-mercaptonaphthalene, and the like are exemplified.

As another example of the sensitizer in the present disclosure, amino acid compounds such as N-phenylglycine, organic metal compounds (for example, tributyl tin acetate and the like) described in JP1973-042965B (JP-S48-042965B), hydrogen donors described in JP1980-034414B (JP-S55-034414B), sulfur compounds (for example, trithianes and the like) described in JP1994-308727A (JP-H6-308727A), and the like are exemplified.

In a case where the second transparent transfer layer in the present disclosure includes the sensitizer, the content of the sensitizer is preferably in a range of 0.01% by mass to 30% by mass and more preferably in a range of 0.05% by mass to 10% by mass of the total solid content amount of the second transparent transfer layer from the viewpoint of further improving the curing rate due to the balance between the polymerization growth rate and the chain transfer.

In a case where the second transparent transfer layer in the present disclosure includes the sensitizer, the second transparent transfer layer may include only one kind of sensitizer or may include two or more kinds of sensitizers.

—Polymerization Inhibitor—

The second transparent transfer layer in the present disclosure is capable of including a polymerization inhibitor.

The polymerization inhibitor has a function of inhibiting the undesired polymerization of the polymerizable monomer while being produced or stored.

The polymerization inhibitor in the present disclosure is not particularly limited, and it is possible to use a well-known polymerization inhibitor depending on the purpose. As the well-known polymerization inhibitor, for example, hydroquinone, p-methoxyphenol, di-t-butyl-p-cresol, pyrogallol, t-butyl catechol, benzoquinone, 4,4'-thiobis(3-methyl-6-t-butylphenol), 2,2'-methylene bis(4-methyl-6-t-butylphenol), N-nitrosophenylhydroxyamine cerous salt, phenothiazine, phenoxazine, and the like are exemplified.

In a case where the second transparent transfer layer in the present disclosure includes the polymerization inhibitor, the amount of the polymerization inhibitor added is preferably 0.001% by mass to 20% by mass of the total solid content of the second transparent transfer layer.

In a case where the second transparent transfer layer in the present disclosure includes the polymerization inhibitor, only one kind of the polymerization inhibitor may be included or two or more kinds of the polymerization inhibitors may be included.

—Compound Capable of Reacting With Acid by Heating—

The second transparent transfer layer in the present disclosure may contain a compound capable of reacting with an acid by heating.

The compound capable of reacting with an acid by heating is preferably a compound having a higher reactivity with an acid after being heated at higher than 25° C. compared with the reactivity with an acid at 25° C. The compound capable of reacting with an acid by heating is preferably a compound which has a group capable of reacting with an acid that is temporarily inactivated by a blocking agent and from which a group derived from the blocking agent is dissociated at a predetermined dissociation temperature.

As the compound capable of reacting with an acid by heating, a carboxylic acid compound, an alcohol compound, an amine compound, blocked isocyanate, an epoxy compound, and the like can be exemplified, and blocked isocyanate is preferred.

As the blocked isocyanate that is used for the transfer material, commercially available blocked isocyanate can also be exemplified. For example, TAKENATE (registered trademark) B870N (manufactured by Mitsui Chemicals, Inc.) that is a methyl ethyl ketone oxime blocked body of isophorone diisocyanate, DURANATE (registered trademark) MF-K60B, TPA-B80E, X3071.04 (all manufactured by Asahi Kasei Corporation) that are hexamethylene diisocyanate-based blocked isocyanate compounds, and the like can be exemplified.

The weight-average molecular weight of the blocked isocyanate included in the second transparent transfer layer is preferably 200 to 3,000, more preferably 250 to 2,600, and particularly preferably 280 to 2,200.

The content of the blocked isocyanate is preferably in a range of 1% by mass to 30% by mass and more preferably in a range of 5% by mass to 20% by mass of the total solid content amount of the second transparent transfer layer from the viewpoint of handleability after transfer and before a heating step and low moisture permeability after the heating step.

In addition, as other additives included in the second transparent transfer layer, for example, surfactants or well-known fluorine-based surfactants described in Paragraph 0017 of JP4502784B and Paragraphs 0060 to 0071 of JP2009-237362A, thermopolymerization inhibitors described in Paragraph 0018 of JP4502784B, and, furthermore, other additives described in Paragraphs 0058 to 0071 of JP2000-310706A are exemplified. As additives that are preferably used in the second transparent transfer layer, MEGAFACE (registered trademark) F-551 (manufactured by DIC Corporation) which is a well-known fluorine-based surfactant is exemplified.

The second transparent transfer layer is formed by applying and drying a solution obtained by dissolving a resin composition for forming the second transparent transfer layer including at least the polymerizable monomer and the resin in a solvent (referred to as the coating fluid for forming the second transparent transfer layer).

(First Transparent Transfer Layer)

The first transparent transfer layer may be a layer including metal oxide particles and a resin or may be a layer that is cured by imparting energy. The first transparent transfer layer may be light-curable, heat-curable, or heat-curable and light-curable. Particularly, in a case where the first transparent transfer layer is a heat-curable and light-curable layer, it is possible to easily produce films.

In a case where the first transparent transfer layer is formed of a negative-type material, the first transparent transfer layer preferably includes, in addition to, the metal oxide particles and the resin (preferably an alkali-soluble resin), a polymerizable monomer and a polymerization initiator and may include other additives depending on the purpose.

The refractive index of the first transparent transfer layer is preferably 1.60 or more and 2.00 or less, more preferably 1.63 or more and 1.90 or less, and still more preferably 1.65 or more and 1.80 or less.

A method for controlling the refractive index of the first transparent transfer layer is not particularly limited, and a method of singly using a transparent resin layer having a desired refractive index, a method of using a transparent resin layer to which particles such as metal particles or metal oxide particles are added, a method of using a complex of a metal salt and a polymer, and the like are exemplified.

The thickness of the first transparent transfer layer is preferably 40 nm or more and 200 nm or less.

—Resin—

The first transparent transfer layer preferably includes a resin.

The resin may have a function as a binder. As the resin, an alkali-soluble resin is preferred, and a resin having a configurational structure derived from at least one kind of (meth)acrylic acid or (meth)acrylic acid ester ((meth)acrylic resin) is more preferred. The detail of the alkali-soluble resin is the same as that of the alkali-soluble resin in the second transparent transfer layer. Particularly, in the first transparent transfer layer, ammonium salts of a resin having an acidic group can be exemplified as examples of a preferred resin.

A composition for forming the first transparent transfer layer may include the ammonium salt of a monomer having an acidic group as a curing component.

—Ammonium Salt of Resin Having Acidic Group—

The ammonium salt of a resin having an acidic group is not particularly limited, and ammonium salts of a (meth) acrylic resin are preferably exemplified.

At the time of preparing the composition for forming the first transparent transfer layer, a step of dissolving the resin having an acidic group in an ammonia aqueous solution and preparing a coating fluid for forming the first transparent transfer layer including a resin in which at least some of acidic groups is ammonium-chlorinated is preferably included.

—Resin Having Acidic Group—

The resin having an acidic group is a resin that is soluble in an aqueous solvent (preferably water or a mixed solvent of a lower alcohol having 1 to 3 carbon atoms and water), and can be appropriately selected from well-known resins without any particular limitation. As a preferred example of the resin having an acidic group, resins having a monovalent acidic group (carboxyl group or the like) are exemplified. The resin included in the first transparent transfer layer is particularly preferably a resin having a carboxyl group.

The resin having an acidic group is preferably an alkali-soluble resin.

The alkali-soluble resin is a linear organic high molecular weight polymer and can be appropriately selected from polymers having at least one group that accelerates alkali solubility in the molecule. As the group that accelerates alkali solubility, that is, the acidic group, for example, a carboxyl group, a phosphoric acid group, a sulfonic acid group, and the like are exemplified, and a carboxyl group is preferred.

As the alkali-soluble resin, copolymers including a structural unit selected from (meth)acrylic acid and styrene in a main chain are preferably exemplified. As the alkali-soluble resin, resins that are soluble in an organic solvent and can be developed by a weak alkali aqueous solution are more preferably exemplified.

In addition, the resin having an acidic group is preferably a (meth)acrylic resin having an acidic group, more preferably a copolymer resin of (meth)acrylic acid and a vinyl compound, and particularly preferably a copolymer resin of (meth)acrylic acid and allyl (meth)acrylate.

Particularly, the first transparent transfer layer preferably includes, as the resin, a copolymer having a structural unit derived from (meth)acrylic acid and a structural unit derived from styrene and more preferably includes a copolymer having a structural unit derived from (meth)acrylic acid, a structural unit derived from styrene, and a structural unit derived from (meth)acrylic acid ester having an ethyleneoxy chain.

The resin that is used for the first transparent transfer layer includes a structural unit derived from (meth)acrylic acid and a structural unit derived from styrene or includes a copolymer having a structural unit derived from (meth) acrylic acid, a structural unit derived from styrene, and a structural unit derived from (meth)acrylic acid ester having an ethyleneoxy chain, and thus film thickness uniformity at the time forming the first transparent transfer layer becomes favorable.

As the resin having an acidic group, a commercially available product may be used. The commercially available product of the resin having an acidic group is not particularly limited and can be appropriately selected according to the purpose. As the commercially available product of the resin having an acidic group, for example, ARUFON (registered trademark) UC3000, UC3510, UC3080, UC3920, UF5041 (all trade name) manufactured by Toagosei Co., Ltd., JONCRYL (registered trademark) 67, JONCRYL 611, JONCRYL 678, JONCRYL 690, JONCRYL 819 (all trade name) manufactured by BASF, and the like are exemplified.

The content of the resin having an acidic group is preferably 10% by mass to 80% by mass, more preferably 15% by mass to 65% by mass, and particularly preferably 20% by mass to 50% by mass of the total solid content of the first transparent transfer layer.

—Other Resins—

The first transparent transfer layer may further include other resins having no acidic group. Other resins having no acidic group are not particularly limited.

—Metal Oxide Particles—

The first transparent transfer layer preferably includes metal oxide particles. In a case where the first transparent transfer layer includes metal oxide particles, it is possible to adjust the refractive index and the light transmittance.

The first transparent transfer layer is capable of including metal oxide particles in a random proportion depending on the kinds and contents of the resin and the polymerizable monomer being used, the kind of the metal oxide particles, and the like.

The kind of the metal oxide particles is not particularly limited, and well-known metal oxide particles can be used.

From the viewpoint of controlling the refractive index to be in a range of the refractive index of the first transparent transfer layer, the first transparent transfer layer preferably contains at least one of zirconium oxide particles ($ZrO_2$ particles), $Nb_2O_5$ particles, or titanium oxide particles ($TiO_2$ particles).

The metal oxide particles are more preferably zirconium oxide particles or titanium oxide particles and still more preferably zirconium oxide particles.

In a case where zirconium oxide particles are used as the metal oxide particles, the content of the zirconium oxide particles is preferably 20% by mass to 95% by mass, more preferably 40% by mass to 95% by mass, still more preferably 60% by mass to 95% by mass, and far still more preferably 60% by mass or more and less than 80% by mass of the total solid content of the first transparent transfer layer since a defect in a second resin layer having the metal oxide particles is not easily observed after transfer, and it is possible to produce a laminate having a favorable transparent electrode pattern-covering property.

In a case where titanium oxide particles are used as the metal oxide particles, the content of the titanium oxide particles is preferably 30% by mass to 70% by mass and more preferably 40% by mass or more and less than 60% by mass of the total solid content of the first transparent transfer layer since a defect in the first transparent transfer layer having the metal oxide particles is not easily observed after transfer, and it is possible to produce a laminate having a favorable transparent electrode pattern-covering property.

The refractive index of the metal oxide particle is preferably higher than the refractive index of a transparent film formed of a composition obtained by removing the metal oxide particles from the coating fluid for forming the first transparent transfer layer.

Specifically, the first transparent transfer layer of the transfer material preferably contains metal oxide particles having a refractive index of 1.50 or more for light having a wavelength of 400 nm to 750 nm, more preferably contains particles having a refractive index of 1.55 or more, still more preferably contains particles having a refractive index of 1.70 or more, particularly preferably contains particles having a refractive index of 1.90 or more, and most preferably contains particles having a refractive index of 2.00 or more.

Here, the refractive index for light having a wavelength of 400 nm to 750 nm being 1.50 or more means that the average refractive index for light having a wavelength in the above-described range is 1.50 or more, and the refractive index does not need to be 1.50 or more for all light rays having a wavelength in the above-described range. In addition, the average refractive index is a value obtained by dividing the total of the measurement values of the refractive index for individual light rays having a wavelength in the above-described range by the number of measurement points.

The average primary particle diameter of the metal oxide particles is preferably 100 nm or less, more preferably 50 nm or less, and still more preferably 20 nm or less from the viewpoint of optical performance such as haze.

The average primary particle diameter of the metal oxide particles is a value obtained by measuring the diameters of 100 random particles by observation using a transmission electron microscope (TEM) and arithmetically averaging the 100 diameters.

The first transparent transfer layer may singly include one kind of the metal oxide particles or may include two or more kinds of the metal oxide particles.

The content of the metal oxide particles in the first transparent transfer layer is preferably 20% by mass to 95% by mass, more preferably 30% by mass to 95% by mass, still more preferably 30% by mass to 85% by mass, and far still more preferably 30% by mass or more and less than 80% by mass of the total solid content of the first transparent transfer layer regardless of the kind of the metal oxide particles. In a case where the content of the metal oxide particles is in the above-described range, the transparent electrode pattern-covering property after transfer further improves.

The first transparent transfer layer is capable of including other components in addition to the resin and the metal oxide particles.

—Metal Oxidation Suppressor—

The first transparent transfer layer preferably includes a metal oxidation suppressor.

The metal oxidation suppressor is preferably a compound having an aromatic ring including a nitrogen atom in the molecule.

In addition, in the metal oxidation suppressor, the aromatic ring including a nitrogen atom is preferably at least one ring selected from the group consisting of an imidazole ring, a triazole ring, a tetrazole ring, a thiadiazole ring, or a fused ring of the above-described ring and another aromatic ring, and the aromatic ring including a nitrogen atom is more preferably an imidazole ring or a fused ring of an imidazole ring and another aromatic ring.

The another aromatic ring may be a homocyclic ring or a heterocyclic ring, but is preferably a homocyclic ring, more preferably a benzene ring or a naphthalene ring, and still more preferably a benzene ring.

As a preferred metal oxidation suppressor, imidazole, benzimidazole, tetrazole, mercapto thiadiazole, and benzotriazole are preferably exemplified, and imidazole, benzimidazole, and benzotriazole are more preferred. As the metal oxidation suppressor, a commercially available product may be used, and it is possible to use, for example, BT120 including benzotriazole manufactured by Johoku Chemical Co., Ltd. and the like.

In addition, the content of the metal oxidation suppressor is preferably 0.1% by mass to 20% by mass, more preferably 0.5% by mass to 10% by mass, and still more preferably 1% by mass to 5% by mass of the total solid content of the first transparent transfer layer.

—Polymerizable Monomer—

The first transparent transfer layer preferably includes a polymerizable monomer such as a polymerizable monomer or a thermopolymerizable monomer from the viewpoint of increasing the strength or the like of a film by curing the first transparent transfer layer. The first transparent transfer layer may include only the above-described monomer having an acidic group as the polymerizable monomer.

As the polymerizable monomer that is used in the first transparent transfer layer, it is possible to use the polymerizable compounds described in Paragraphs 0023 and 0024 of JP4098550B. Among them, pentaerythritol tetraacrylate, pentaerythritol triacrylate, and tetraacrylate of a pentaerythritol ethylene oxide adduct can be preferably used. These polymerizable monomers may be used singly or a plurality of the polymerizable monomers may be used in combination. In the case of using a mixture of pentaerythritol tetraacrylate and pentaerythritol triacrylate, the ratio of pentaerythritol triacrylate is preferably more than 0% and 80% or less and more preferably 10% to 60% in terms of the mass ratio.

As the polymerizable monomer that is used in the first transparent transfer layer, water-soluble polymerizable monomers represented by Structural Formula 1 below, a pentaerythritol tetraacrylate mixture (NK ESTER A-TMMT: manufactured by Shin-Nakamura Chemical Co., Ltd., containing approximately 10% of triacrylate as an impurity), a mixture of pentaerythritol tetraacrylate and triacrylate (NK ESTER A-TMM3LM-N manufactured by Shin-Nakamura Chemical Co., Ltd., 37% of triacrylate), a mixture of pentaerythritol tetraacrylate and triacrylate (NK ESTER A-TMM-3L manufactured by Shin-Nakamura Chemical Co., Ltd., 55% of triacrylate), a mixture of pentaerythritol tetraacrylate and triacrylate (NK ESTER A-TMM3 manufactured by Shin-Nakamura Chemical Co., Ltd., 57% of triacrylate), tetraacrylate of a pentaerythritol ethylene oxide adduct (KAYARAD RP-1040 manufactured by Nippon Kayaku Co., Ltd.), and the like can be exemplified.

Structural Formula 1

As other polymerizable monomers that are used in the first transparent transfer layer, polymerizable monomers that are soluble in an aqueous solvent such as water or a solvent mixture of a lower alcohol having 1 to 3 carbon atoms and water and monomers having an acidic group are preferred. As the polymerizable monomers that are soluble in an aqueous solvent, monomers having a hydroxyl group and monomers having an ethylene oxide or a polypropylene oxide and a phosphoric acid group in the molecule are exemplified. As the monomers having an acidic group, polymerizable monomers containing a carboxyl group are preferred, acrylic monomers such as (meth)acrylate or derivatives thereof can be more preferably used, and, among them, ARONIX TO-2349 (Toagosei Co., Ltd.) is particularly preferred.

—Polymerization Initiator—

The first transparent transfer layer is capable of including a polymerization initiator.

The polymerization initiator that is used in the first transparent transfer layer is preferably a polymerization initiator that is soluble in an aqueous solvent. As the polymerization initiator that is soluble in an aqueous solvent, IRGACURE 2959, photopolymerization initiators of Structural Formula 2 below, and the like are exemplified.

Structural Formula 2

Hitherto, a case where the transfer material is a negative material has been mainly described, but the transfer material may be a positive material. In a case where the transfer material is a positive material, a material described in, for example, JP2005-221726A can be used for the first transparent transfer layer, but the material is not limited thereto.

The coating fluid for forming the first transparent transfer layer that is used to form the first transparent transfer layer is capable of including a solvent.

As the solvent, for example, diacetone alcohol (3.2 mPa·s), ethylene glycol (32.5 mPa·s), propylene glycol (56 mPa·s), isobutyl alcohol (4.2 mPa·s), and the like are exemplified.

The transfer material may have, in addition to the above-described transparent conductive layer, other random layers such as a thermoplastic resin layer, an interlayer, and a protective film as long as the effect of the present invention is not impaired.

<Method for Manufacturing Touch Sensor>

The touch sensor of the embodiment of the present disclosure can be manufactured by selecting a random method as long as the method is a method capable of producing the above-described structure and is preferably manufactured using a method for manufacturing the touch sensor of the embodiment of the present disclosure which will be described below, that is, a method sequentially having a step of forming the first transparent layer having a refractive index of 1.6 or more and a thickness of 200 nm or less on an electrode pattern-attached base material by transferring the transfer layer of the transfer material (first transparent layer-forming step) and a step of forming the second transparent layer having a refractive index of less than 1.6 and a thickness of 0.5 μm or more on the electrode pattern-attached base material by transferring a transfer layer of the transfer material.

The detail of the transfer material is as described above (second transparent layer-forming step).

The method for manufacturing the touch sensor of the embodiment of the present disclosure preferably has a step of forming through holes in the first transparent layer and the second transparent layer formed in the first transparent layer-forming step and the second transparent layer-forming step. In a case where the first transparent transfer layer and the second transparent transfer layer are formed of a photosensitive material, the through holes can be formed by exposing a photosensitive layer formed of the photosensitive material in a pattern shape and developing the photosensitive layer. In addition, in a case where the first transparent layer and the second transparent layer are not photosensitive, it is possible to form the first transparent transfer layer and the second transparent transfer layer and then form the through holes using an etching method in which a so-called etching resist is used.

In addition, the method for manufacturing the touch sensor of the embodiment of the present disclosure may have a step of further forming an overcoat layer on the first transparent transfer layer and the second transparent transfer layer formed in the first transparent layer-forming step and the second transparent layer-forming step.

Transfer can be carried out using a transfer method in which the transparent transfer layers in the transfer material are transferred onto the base material using the transfer material. The transfer material may be used in any of a film form or a sheet form. Specifically, for example, the transparent transfer layer can be transferred onto and formed on the base material by bringing a surface of the transparent transfer layer of a transfer film into contact with the base material to be laminated on the base material and peeling a temporary support of the transfer film.

A method for exposing a material for forming a layer in a pattern shape is not particularly limited, and the material may be exposed by surface exposure in which a photomask is used or may be exposed by scanning and exposing the material using laser beams or the like. In addition, the material may be exposed by refraction-type exposure in which a lens is used or may be exposed by reflection-type exposure in which a reflection mirror is used. In addition, the material may be exposed using an exposure method such as contact exposure, proximity exposure, reduced projection exposure, or reflection projection exposure.

A light source is preferably a g ray, an h ray, an i ray, a j ray, or the like. As the kind of the light sources, for example, a metal halide lamp, a high-pressure mercury lamp, and a light emitting diode (LED) are exemplified.

In addition, in development after exposure, an alkali developer is generally used.

EXAMPLES

Hereinafter, the present invention will be more specifically described using examples, but the present invention is not limited to the following examples within the scope of the gist of the present invention.

Compositional ratios in a polymer are molar ratios unless particularly otherwise described. In addition, in the following examples, a case where a transfer film is produced as an example of the transfer material will be described.

In addition, in the following examples, the weight-average molecular weight of a resin was measured by gel permeation chromatography (GPC) under the following conditions. A calibration curve was produced from "standard specimen TSK standard, polystyrene" manufactured by Tosoh Corporation: eight samples of "F-40", "F-20", "F-4", "F-1", "A-5000", "A-2500", "A-1000", and "n-propylbenzene".

<Conditions>

GPC: HLC (registered trademark)-8020GPC (manufactured by Tosoh Corporation)

Column: Three TSKgel (registered trademark), Super Multipore HZ-H (manufactured by Tosoh Corporation, 4.6 mmID×15 cm)

Eluant: Tetrahydrofuran (THF)

Specimen concentration: 0.45% by mass

Flow rate: 0.35 ml/min

Sample injection amount: 10 µl

Measurement temperature: 40° C.

Detector: Differential refractometer (RI)

<Preparation of Coating Fluid for Forming Second Transparent Transfer Layer>

Materials A-1 to A-4 that were coating fluids for forming a second transparent transfer layer were prepared according to components and contents which forms compositions shown in Table 1 below.

TABLE 1

|  | Component | Material A-1 | Material A-2 | Material A-3 | Material A-4 |
|---|---|---|---|---|---|
| Polymerizable monomer | Tricyclodecane dimethanol diacrylate (A-DCP, manufactured by Shin-Nakamura Chemical Co., Ltd.) | 5.60 | 5.60 | 5.60 | 5.60 |
|  | Carboxylic acid-containing monomer ARONIX TO-2349 (manufactured by Toagosei Co., Ltd.) | 0.93 | 0.93 | 0.93 | 0.93 |
|  | Urethane acrylate 8UX-015A (manufactured by Taisei Fine Chemical Co., Ltd.) | 2.80 | 2.80 | 2.80 | 2.80 |
| Binder polymer (alkali-soluble resin) | Compound A below (acid value: 95 mgKOH/g, Mw: 29,000, and Mn: 13,700) | 15.59 | — | 15.59 | 15.59 |
|  | Compound B below (acid value: 95 mgKOH/g, Mw: 15,000, and Mn: 7,100) | — | 15.59 | — | — |
| Photopolymerization initiator | Ethanone, 1-[9-ethyl-6-(2-methylbenzoyl)-9H-carbazole-3-yl]-, 1-(0-acetyloxime) (OXE-02, manufactured by BASF) | 0.11 | 0.11 | 0.11 | 0.11 |
|  | 2-Methyl-1-(4-methyl thiophenyl)-2-morpholino propan-1-one (Irgacure 907, manufactured by BASF) | 0.21 | 0.21 | 0.21 | 0.21 |
| Sensitizer | Karenz MTBD-1 (thiol compound, manufactured by Showa Denko K. K.) | — | 0.15 | — | — |
|  | N-phenylglycine (manufactured by Yodo Kagaku Co., Ltd.) | 0.03 | — | 0.15 | 0.15 |
| Polymerization inhibitor | Phenothiazine (manufactured by Tokyo Chemical Industry Co., Ltd.) | — | 0.001 | — | — |
| Blocked isocyanate | DURANATE WT32-B75P (manufactured by Asahikasei Chemicals. Corporation) | 3.63 | — | — | — |
|  | KARENZ AOI-BM (manufactured by Showa Denko K. K.) | — | 3.63 | 3.63 | 3.63 |
| Additives | MEGAFACE F-551 (manufactured by DIC Corporation) | 0.02 | 0.02 | 0.02 | 0.02 |
|  | Benzoimidazole (manufactured by Yixing Lark Fine Chemical Co., Ltd.) | 0.09 | — | — | — |
|  | 1,2,4-Triazole (manufactured by Otsuka Chemical Co., Ltd.) | — | 0.09 | 0.09 | 0.09 |

TABLE 1-continued

| Component | | Material A-1 | Material A-2 | Material A-3 | Material A-4 |
|---|---|---|---|---|---|
| ZrO$_2$ particle dispersion liquid | ZR-010 (non-volatile component: 30.5%) manufactured by Solar Co., Ltd. | — | — | 6.00 | 12.00 |
| Solvent | 1-Methoxy-2-propyl acetate | 31.08 | 31.08 | 31.08 | 31.08 |
| | Methyl ethyl ketone | 40.00 | 40.00 | 40.00 | 40.00 |
| | Total (parts by mass) | 100 | 100 | 100 | 100 |

Compound A: Mw = 29000, Mn = 13700

Compound B: Mw = 15000, Mn = 7100

<Preparation of Coating Fluid for Forming First Transparent Transfer Layer>

Next, Materials B-1 to B-5 that were coating fluids for forming a first transparent transfer layer were prepared according to compositions shown in Table 2 below.

TABLE 2

| Raw material | | Mw | Acid value [mgKOH/g] | Material B-1 | Material B-2 | Material B-3 | Material B-4 | Material B-5 |
|---|---|---|---|---|---|---|---|---|
| NANOUSE OZ-S30M: ZrO$_2$ particles, methanol dispersion liquid (non-volatile component: 30.5%), manufactured by Nissan Chemical Industries Ltd. | | — | | 4.34 | 4.34 | 3.10 | 6.00 | 2.20 |
| Ammonia water (25%) | | — | | 7.82 | 7.82 | 7.82 | 7.82 | 7.82 |
| Monoisopropanolamine (manufactured by Mitsui Fine Chemicals, Inc.) | | — | | 0.02 | 0.02 | 0.02 | 0.02 | 0.02 |
| Binder polymer | Copolymer resin of methacrylic acid and allyl methacrylate (Mw: 38,000, Mn: 8,500, compositional ratio = 40/60 (molar ratio)) | 38000 | 130 | 0.24 | 0.24 | 0.24 | 0.24 | 0.24 |
| | Compound C | 15500 | 240 | 0.01 | — | 0.01 | 0.01 | 0.01 |
| | Compound D | 2000 | 70 | — | 0.01 | — | — | — |
| Carboxylic acid-containing monomer ARONIX TO-2349 (manufactured by Toagosei Co., Ltd.) | | — | — | 0.03 | 0.03 | 0.03 | 0.03 | 0.03 |
| Benzotriazole BT-LX (manufactured by Johoku Chemical Co., Ltd.) | | — | — | 0.03 | 0.03 | 0.03 | 0.03 | 0.03 |
| MEGAFACE F-444 (manufactured by DIC Corporation) | | — | — | 0.01 | 0.01 | 0.01 | 0.01 | 0.01 |
| Ion exchange water | | — | — | 21.5 | 21.5 | 22.8 | 19.9 | 23.7 |
| Methanol | | — | — | 66.0 | 66.0 | 66.0 | 66.0 | 66.0 |
| | Total (parts by mass) | | | 100 | 100 | 100 | 100 | 100 |

Compound C:

Compound D:

TABLE 2-continued

| Raw material | Mw | Acid value [mgKOH/g] | Material B-1 | Material B-2 | Material B-3 | Material B-4 | Material B-5 |
|---|---|---|---|---|---|---|---|

Examples 1 and 2

<Production of Transfer Film 1>

Any of Material A-1 or A-2 for forming the second transparent transfer layer was applied onto a temporary support that was a 16 µm-thick polyethylene terephthalate film using a slit-shaped nozzle at an application amount adjusted to obtain a film thickness after drying of 5.0 µm. Next, a solvent was volatilized in a drying zone (80° C.), thereby forming a second transparent transfer layer. According to a combination in Table 4, any of Material B-1 or B-2 for forming the first transparent transfer layer was applied onto a dried film of the material for forming the second transparent transfer layer (second transparent transfer layer) using the slit-shaped nozzle at an application amount adjusted to obtain a film thickness after drying of 80 nm and then dried at a drying temperature of 70° C., thereby forming a first transparent transfer layer. As shown in Table 4, Material A-1 and Material B-1 were used in Example 1, and Material A-2 and Material B-2 were used in Example 2.

Next, a 16 µm-thick polyethylene terephthalate was attached to a surface of the first transparent transfer layer by pressure as a protective film, thereby producing a transfer film 1.

<Production of Transparent Electrode Pattern Film>

(Formation of Transparent Film)

A corona discharge treatment was carried out for three seconds on a cycloolefin resin film having a film thickness of 38 µm and a refractive index of 1.53 using a high-frequency oscillator and a wire electrode having a diameter of 1.2 mm at an output voltage of 100% and an output of 250 W under conditions of an electrode length being 240 mm and a distance between work electrodes being 1.5 mm to modify a surface, thereby producing a transparent film substrate.

Next, a material of Material-C shown in Table 3 was applied to the corona discharge treatment surface of the transparent film substrate using a slit-shaped nozzle and then irradiated with ultraviolet rays (integrated light quantity: 300 mJ/cm$^2$). Next, the material was dried at approximately 110° C., thereby forming a transparent film having a refractive index of 1.60 and a film thickness of 80 nm.

TABLE 3

| Raw material | Material -C |
|---|---|
| ZrO$_2$: Manufactured by Solar Co., Ltd., ZR-010 | 2.08 |
| DPHA liquid (dipentaerythritol hexaacrylate: 38%, dipentaerythritol pentaacrylate: 38%, 1-methoxy-2-porpyl acetate: 24%) | 0.29 |
| Urethane-based monomer: UK OLIGO UA-32P, manufactured by Shin-Nakamura Chemical Co., Ltd.: non-volatile component: 75%, 1-methoxy-2-propyl acetate: 25% | 0.14 |
| Monomer mixture (polymerizable compound (b2-1) described in Paragraph [0111] of JP2012-078528A, n = 1: content rate of tripentaerythritol octaacrylate: 85%, total of n = 2 and n = 3 as an impurity is 15%) | 0.36 |
| Polymer solution 1 (Structural Formula P-25 described in Paragraph [0058] of JP2008-146018A: weight-average molecular weight = 35,000, solid content: 45%, 1-methoxy-2-propyl acetate: 15%, 1-methoxy-2-propanol: 40%) | 1.89 |
| Photo-radical polymerization initiator: 2-Benzyl-2-dimethylamino-1-(4-morpholinophenyl)-butanone (Irgacure (registered trademark) 379, manufactured by BASF) | 0.03 |
| Photopolymerization initiator: KAYACURE DETX-S (manufactured by Nippon Kayaku Co., Ltd., alkyl thioxanthone) | 0.03 |
| Polymer solution 2 (polymer having a structural formula represented by Formula (3): a solution having a weight-average molecular weight of 15,000, non-volatile component: 30% by mass, methyl ethyl ketone: 70% by mass) | 0.01 |
| 1-Methoxy-2-propyl acetate | 38.73 |
| Methyl ethyl ketone | 56.80 |
| Total (parts by mass) | 100 |

Formula (3)    Mw: 15000

<Formation of Transparent Electrode Pattern>

A film having the transparent film formed on a transparent film substrate was introduced into a vacuum chamber, and an ITO thin film having a thickness of 40 nm and a refractive index of 1.82 was formed as a transparent electrode layer by direct current (DC) magnetron sputtering (conditions: the temperature of the transparent film substrate: 150° C., argon pressure: 0.13 Pa, and oxygen pressure: 0.01 Pa) using an ITO target (indium:tin=95:5 (molar ratio)) having a SnO$_2$ content ratio of 10% by mass, thereby obtaining a film having the transparent film and the transparent electrode layer laminated on the transparent film substrate. The surface electrical resistance of the ITO thin film was 80 Ω/□ (Ω per square).

Next, the ITO thin film was patterned by etching using a well-known chemical etching method, thereby obtaining an electrode-attached film having the transparent film and a transparent electrode pattern on the transparent film substrate.

Here, the transparent electrode pattern has a first electrode pattern and a second electrode pattern respectively extending in mutually intersecting directions, as shown in FIG. 1 and FIG. 2, the first electrode pattern has a plurality of first island-shaped electrode portions 12 formed at intervals in a first direction P on the transparent film substrate 24 and first wire portions 16 that electrically connect the first island-shaped electrode portions 12 adjacent to each other, and the second electrode pattern has a plurality of second island-shaped electrode portions 14 formed at intervals in a second direction Q intersecting the first direction P on the substrate.

<Production of Transparent Laminate>

The protective film in the transfer film 1 produced above was peeled off, the peeled surface of the transfer film 1 was brought into contact with the transparent film and transparent electrode pattern-formed surface of the electrode-attached film, and the transfer film 1 was laminated on the electrode-attached film under the following conditions, thereby obtaining a laminate body.

<Conditions>
Temperature of transparent film substrate 24: 40° C.
Temperature of rubber roller: 110° C.
Linear pressure: 3 N/cm
Transportation rate: 2 m/min.

Next, the distance between a surface of an exposure mask (mask for forming through holes) and a surface of the temporary support was set to 125 μm, and the laminate body was exposed through the temporary support in a pattern shape using a proximity-type stepper (Hitachi High-Tech Electronics Engineering Co., Ltd.) at an exposure amount of an i ray being 100 mJ/cm².

After that, the temporary support was peeled off from the laminate body, and the peeled surface (a surface of the second transparent transfer layer) was washed for 60 seconds using a sodium carbonate 2% by mass aqueous solution (temperature: 32° C.). After the washing, ultrapure water was sprayed to the surface of the second transparent transfer layer on the transparent film substrate from an ultrahigh-pressure washing nozzle, thereby removing a residue. Next, air was blown to the surface of the second transparent transfer layer to remove moisture, and a post baking treatment was carried out at a temperature of 145° C. for 30 minutes.

At this time, as shown in FIG. 1 and FIG. 2, through holes 20 for connecting the second island-shaped electrode portions 14 and bridge wires (second wire portions) 18 for electrically connecting the second island-shaped electrode portions 14 by building a bridge between two second island-shaped electrode portion 14 adjacent to each other were formed in a first transparent layer 28 and a second transparent layer 30 located on the second island-shaped electrode portions 14 in the transparent electrode pattern on the transparent film substrate 24.

A transparent laminate having the transparent film, the transparent electrode pattern, the first transparent layer, and the second transparent layer sequentially laminated on the transparent film substrate from the transparent film substrate side was produced in the above-described manner.

Here, the first transparent layer is a cured layer of the first transparent transfer layer in the transfer film 1, and the second transparent layer is a cured layer of the second transparent transfer layer in the transfer film 1.

<Formation of Bridge Wires (Second Wire Portions)>

Next, a 30 nm-thick gold (Au) film was formed on an entire surface of the transparent laminate using direct current magnetron sputtering. In addition, the Au film in regions except for portion in which bridge wires 18 that connected the second island-shaped electrode portions 14 adjacent to each other were to be formed were removed using a well-known method, thereby providing the bridge wires (second wire portions) 18 at locations at which two second island-shaped electrode portions 14 adjacent two each other were to be connected by building a bridge on the first transparent layer 28 and the second transparent layer 30 as shown in FIG. 1 and FIG. 2.

<Formation of Overcoat Layer>

Next, Material A-1 was applied onto a temporary support that was a 16 μm-thick polyethylene terephthalate film using a slit-shaped nozzle at an application amount adjusted to obtain a film thickness after drying of 10.0 μm and dried at a temperature of 80° C., thereby forming an overcoat layer. A protective film (12 μm-thick polypropylene film) was attached to a surface of the formed overcoat layer by pressure, thereby producing a transfer film for the overcoat layer.

The transfer film for the overcoat layer was laminated on the transparent laminate having the bridge wires (second wire portions) formed thereon using the transfer film for the overcoat layer from which the protective film was peeled off under the following conditions to transfer the overcoat layer, thereby obtaining an overcoat layer-attached transparent laminate as shown in FIG. 2.

<Conditions>
Temperature of transparent film substrate 24: 40° C.
Temperature of rubber roller: 110° C.
Linear pressure: 3 N/cm
Transportation rate: 2 m/min.

Next, the distance between a surface of an exposure mask (silica exposure mask having a pattern for an overcoat) and a surface of the temporary support was set to 125 μm, and the overcoat layer-attached transparent laminate was exposed through the temporary support in a pattern shape using a proximity-type stepper (Hitachi High-Tech Electronics Engineering Co., Ltd.) at an exposure amount of an i ray being 100 mJ/cm².

Next, the temporary support was peeled off from the overcoat layer-attached transparent laminate, and the peeled surface (a surface of the overcoat layer) was washed for 60 seconds using a sodium carbonate 2% by mass aqueous solution (temperature: 32° C.). Ultrapure water was sprayed to the washed surface of the overcoat layer in the overcoat layer-attached transparent laminate from an ultrahigh-pressure washing nozzle, thereby removing a residue. Next, air was blown to the surface of the overcoat layer to remove moisture on the overcoat layer, and a post baking treatment was carried out at a temperature of 145° C. for 30 minutes.

A transparent laminate 100 sequentially having a transparent film 26, the transparent electrode pattern (including the first island-shaped electrode portions, the first wire portions 16, the second island-shaped electrode portions, and the bridge wires 18), the first transparent layer 28, the second transparent layer 30, and an overcoat layer 32 on the transparent film substrate 24 as shown in FIG. 1 and FIG. 2 was produced in the above-described manner.

Example 3

A transfer film 2 that was different from the above-described transfer film was produced as described below.

Material B-3 for forming a third transparent transfer layer was applied onto a temporary support that was a 16 μm-thick polyethylene terephthalate film using a slit-shaped nozzle at an application amount adjusted to obtain a film thickness after drying of approximately 80 nm. Next, a solvent was volatilized in a drying zone (80° C.), thereby forming a third transparent transfer layer. Next, 16 μm-thick polyethylene terephthalate was attached to a surface of the third transparent transfer layer by pressure as a protective film, thereby producing a transfer film 2.

The transfer film 2 was laminated on the second transparent layer on which the post baking treatment in "the production of the transparent laminate" of Example 1 so that the third transparent transfer layer came into contact with the second transparent layer, and the third transparent transfer layer was transferred onto the second transparent layer. The transfer film was laminated on the second transparent layer under the same conditions as in the lamination of the transfer film 1.

Next, through holes were formed in the transferred third transparent transfer layer by a well-known etching method, and a third transparent layer was formed on the second transparent layer. The third transparent layer is a cured layer of the third transparent transfer layer in the transfer film 2.

Next, "bridge wires were formed" and "an overcoat layer was formed" in the same manner as in Example 1, thereby producing a transparent laminate.

The produced transparent laminate sequentially has a transparent film, the transparent electrode pattern (including the first island-shaped electrode portions, the first wire portions, the second island-shaped electrode portions, and the bridge wires), the first transparent layer, the second transparent layer, the third transparent layer (not shown), and an overcoat layer on the transparent film substrate.

Examples 4 to 17

Transfer films and transparent laminates were produced in the same manner as in Example 3 except for the fact that, in Example 3, the materials and the film thicknesses of the first transparent layer, the second transparent layer, and the third transparent layer were adjusted like combinations in Table 4.

Comparative Example 1

A transfer film and a transparent laminate were produced in the same manner as in Example 1 except for the fact that, in Example 1, the first transparent layer was not formed.

<Evaluation>

Transparent Electrode Pattern-Covering Property—

A black polyethylene terephthalate (PET) material was attached to the transparent film substrate of the transparent laminate having the transparent film, the transparent electrode pattern, the first transparent layer, the second transparent layer, and the overcoat layer sequentially laminated on the transparent film substrate using transparent adhesive tape (trade name: OCA TAPE 8171CL, manufactured by 3M), thereby blocking the entire substrate from light.

In a dark room, light from a fluorescent lamp was radiated to the transparent laminate from above the overcoat layer on a side opposite to the side on which the black PET material was adhered, reflected light from the overcoat layer was visually observed at an angle, and the appearance of the transparent electrode pattern was evaluated according to the following evaluation standards. Among the evaluation standards, A, B, and C are in a practically permissible range, A or B is preferred, and A is more preferred.

<Evaluation Standards>

A: The electrode pattern is not visible in the case of being carefully observed from a location 15 cm apart from the laminate, and the electrode pattern is also not visible in the case of being normally observed from a location 40 cm apart from the laminate.

B: The electrode pattern is slightly visible in the case of being carefully observed from a location 15 cm apart from the laminate, but the electrode pattern is not visible in the case of being normally observed from a location 40 cm apart from the laminate.

C: The electrode pattern is slightly visible in the case of being carefully observed from a location 15 cm apart from the laminate, and the electrode pattern is slightly visible in the case of being normally observed from a location 40 cm apart from the laminate.

D: The electrode pattern is clearly visible in the case of being carefully observed from a location 15 cm apart from the laminate, and the electrode pattern is slightly visible in the case of being normally observed from a location 40 cm apart from the laminate.

E: The electrode pattern is clearly visible in the case of being carefully observed from a location 15 cm apart from the laminate, but the electrode pattern is clearly visible in the case of being normally observed from a location 40 cm apart from the laminate.

TABLE 4

| | First transparent layer | | | Second transparent layer | | | Third transparent layer | | | |
| --- | --- | --- | --- | --- | --- | --- | --- | --- | --- | --- |
| | Material | Refractive index | Film thickness | Material | Refractive index | Film thickness | Material | Refractive index | Film thickness | Evaluation |
| Example 1 | Material B-1 | 1.68 | 80 nm | Material A-1 | 1.51 | 5 μm | — | — | — | A |
| Example 2 | Material B-2 | 1.68 | 80 nm | Material A-2 | 1.51 | 5 μm | — | — | — | A |
| Example 3 | Material B-1 | 1.68 | 80 nm | Material A-1 | 1.51 | 5 μm | Material B-3 | 1.65 | 80 nm | A |
| Example 4 | Material B-3 | 1.65 | 80 nm | Material A-1 | 1.51 | 5 μm | Material B-3 | 1.65 | 80 nm | A |
| Example 5 | Material B-4 | 1.71 | 80 nm | Material A-1 | 1.51 | 5 μm | Material B-3 | 1.65 | 80 nm | A |
| Example 6 | Material B-5 | 1.62 | 80 nm | Material A-1 | 1.51 | 5 μm | Material B-3 | 1.65 | 80 nm | B |

TABLE 4-continued

|  | First transparent layer | | | Second transparent layer | | | Third transparent layer | | | Evaluation |
|---|---|---|---|---|---|---|---|---|---|---|
|  | Material | Refractive index | Film thickness | Material | Refractive index | Film thickness | Material | Refractive index | Film thickness |  |
| Example 7 | Material B-1 | 1.68 | 60 nm | Material A-1 | 1.51 | 5 μm | Material B-3 | 1.65 | 80 nm | A |
| Example 8 | Material B-1 | 1.68 | 100 nm | Material A-1 | 1.51 | 5 μm | Material B-3 | 1.65 | 80 nm | A |
| Example 9 | Material B-1 | 1.68 | 80 nm | Material A-3 | 1.53 | 5 μm | Material B-3 | 1.65 | 80 nm | A |
| Example 10 | Material B-1 | 1.68 | 80 nm | Material A-4 | 1.55 | 5 μm | Material B-3 | 1.65 | 80 nm | A |
| Example 11 | Material B-1 | 1.68 | 80 nm | Material A-1 | 1.51 | 1 μm | Material B-3 | 1.65 | 80 nm | A |
| Example 12 | Material B-1 | 1.68 | 80 nm | Material A-1 | 1.51 | 7 μm | Material B-3 | 1.65 | 80 nm | A |
| Example 13 | Material B-1 | 1.68 | 80 nm | Material A-1 | 1.51 | 10 μm | Material B-3 | 1.65 | 80 nm | A |
| Example 14 | Material B-1 | 1.68 | 80 nm | Material A-1 | 1.51 | 5 μm | Material B-1 | 1.68 | 80 nm | A |
| Example 15 | Material B-1 | 1.68 | 80 nm | Material A-1 | 1.51 | 5 μm | Material B-4 | 1.71 | 80 nm | A |
| Example 16 | Material B-1 | 1.68 | 80 nm | Material A-1 | 1.51 | 5 μm | Material B-3 | 1.65 | 60 nm | A |
| Example 17 | Material B-1 | 1.68 | 80 nm | Material A-1 | 1.51 | 5 μm | Material B-3 | 1.65 | 100 nm | A |
| Comparative Example 1 | — | — | — | Material A-1 | 1.51 | 5 μm | — | — | — | E |

<Production of Image Display Device (Touch Panel)>

The transparent laminate of the present disclosure having the transparent film, the transparent electrode pattern, the first transparent layer, the second transparent layer, and the overcoat layer in this order on the transparent film substrate was attached to a liquid crystal display element manufactured using a method described in Paragraphs 0097 to 0119 of JP2009-047936A, and, furthermore, a front surface glass was attached thereto, thereby producing an image display device including an electrostatic capacitance-type input device as a configurational element using a well-known method.

<Evaluation>

Evaluation of Electrostatic Capacitance-Type Input Device and Image Display Device—

In the electrostatic capacitance-type input device and the image display device which included the transparent laminate, the transparent electrode pattern was not visible. In addition, there is no defect such as an air bubble in the transparent laminate, and the image display device was excellent in terms of display characteristics.

EXPLANATION OF REFERENCES

12: first island-shaped electrode portion
14: second island-shaped electrode portion
16: first wire portion
18: second wire portion (bridge wire)
20: through hole
24: transparent substrate (transparent film substrate)
26: transparent layer
28: first transparent layer
30: second transparent layer
32: overcoat layer
34: first electrode pattern
36: second electrode pattern
100: transparent laminate
P: first electrode pattern extension direction
Q: second electrode pattern extension direction

What is claimed is:

1. A touch sensor comprising:
a first electrode pattern and a second electrode pattern respectively extending in mutually intersecting directions on the same surface of a transparent substrate,
a first transparent layer having a refractive index of 1.6 or more and a thickness of 200 nm or less and a second transparent layer having a refractive index of less than 1.6 and a thickness of 0.5 μm or more, the first transparent layer and the second transparent layer being sequentially superimposed on the first electrode pattern and the second electrode pattern,
wherein the first transparent layer is a single layer and the second transparent layer is a single layer,
the first transparent layer directly contacts with the first electrode pattern and the second electrode pattern,
the second transparent layer is a cured substance of a composition including an alkali-soluble resin, a polymerizable monomer, and a photopolymerization initiator,
the thickness of the second transparent layer is 1.0 mm or more,
the first electrode pattern has a plurality of first island-shaped electrode portions disposed at intervals in a first direction on the substrate and first wire portions that electrically connect the first island-shaped electrode portions adjacent to each other, and
the second electrode pattern has a plurality of second island-shaped electrode portions disposed at intervals in a second direction intersecting the first direction on the substrate and second wire portions that electrically connect the second island-shaped electrode portions adjacent to each other by building a bridge on the first transparent layer and the second transparent layer.

2. The touch sensor according to claim 1,
wherein the first transparent layer and the second transparent layer have through holes, and the second wire portions electrically connect the second island-shaped electrode portions adjacent to each other through the through holes.

3. The touch sensor according to claim 1,
wherein the second wire portion is formed of a metal wire.

4. The touch sensor according to claim 1,
wherein the first transparent layer has a thickness of 40 nm or more and 200 nm or less and a refractive index of 1.6 or more and 1.9 or less, and
the second transparent layer has a thickness of 0.5 µm or more and 20 µm or less and a refractive index of 1.4 or more and less than 1.6.

5. The touch sensor according to claim 1, further comprising:
a third transparent layer having a refractive index of 1.6 or more and a thickness of 40 nm or more and 200 nm or less between the second transparent layer and the second wire portions.

6. The touch sensor according to claim 1,
wherein a weight-average molecular weight of the alkali-soluble resin is 35,000 or less.

7. The touch sensor according to claim 1,
wherein a content of a component derived from the alkali-soluble resin in the second transparent layer is 30% by mass or more of a solid content of the second transparent layer.

8. A method for manufacturing the touch sensor according to claim 1, the method sequentially comprising:
forming a first transparent layer having a refractive index of 1.6 or more and a thickness of 200 nm or less on an electrode pattern-attached base material by transferring a transfer layer of a transfer material; and
forming a second transparent layer having a refractive index of less than 1.6 and a thickness of 0.5 µm or more on the electrode pattern-attached base material by transferring a transfer layer of a transfer material.

9. The touch sensor according to claim 1,
wherein the refractive index of the first electrode pattern is 1.75 or more and 2.1 or less, and the refractive index of the second electrode pattern is 1.75 or more and 2.1 or less.

10. The touch sensor according to claim 1,
wherein the second transparent layer is in direct contact with the second wire portions.

11. The touch sensor according to claim 1,
wherein the first transparent layer is a cured substance of a composition including a polymerizable monomer having a carboxyl group.

12. The touch sensor according to claim 1,
wherein the second transparent layer is a cured substance of a composition including a polymerizable monomer containing a carboxyl group.

13. The touch sensor according to claim 1,
wherein the second transparent layer is a cured substance of a composition including a bifunctional monomer.

14. The touch sensor according to claim 13,
wherein the bifunctional monomer of the second transparent layer is a compound selected from the group consisting of tricyclodecane dimethanol diacrylate, tricyclodecane dimethanol dimethacrylate, 1,9-nonanediol diacrylate, and 1,6-hexanediol diacrylate.

15. The touch sensor according to claim 1,
wherein the second transparent layer is a cured substance of a composition including a compound capable of reacting with an acid by heating.

16. The touch sensor according to claim 15,
wherein the compound capable of reacting with an acid by heating is a blocked isocyanate.

17. The touch sensor according to claim 1,
wherein the second transparent layer is a cured substance of a composition including ethanone 1-[9-ethyl-6-(2-methylbenzoyl)-9H-carbazol-3-yl]-1-(O-acetyloxime).

18. The touch sensor according to claim 1,
wherein a thickness of the second transparent layer is 10 µm or less.

* * * * *